United States Patent
Garfinkle et al.

(10) Patent No.: US 9,536,366 B2
(45) Date of Patent: Jan. 3, 2017

(54) SYSTEMS AND METHODS FOR VOTING

(75) Inventors: Norton Garfinkle, New York, NY (US); Richard Garfinkle, Chicago, IL (US)

(73) Assignee: DEMOCRACYONTHEWEB, LLC, New York, NY (US)

( * ) Notice: Subject to any disclaimer, the term of this patent is extended or adjusted under 35 U.S.C. 154(b) by 722 days.

(21) Appl. No.: 12/872,523

(22) Filed: Aug. 31, 2010

(65) Prior Publication Data

US 2012/0053997 A1    Mar. 1, 2012

(51) Int. Cl.
 G07C 13/00    (2006.01)
 H04L 29/06    (2006.01)

(52) U.S. Cl.
 CPC ............... *G07C 13/00* (2013.01); *H04L 63/08* (2013.01)

(58) Field of Classification Search
 USPC ............................................ 705/12; 713/168
 See application file for complete search history.

(56) References Cited

U.S. PATENT DOCUMENTS

| | | | |
|---|---|---|---|
| 5,883,810 A | 3/1999 | Franklin et al. | |
| 5,987,440 A | 11/1999 | O'Neil et al. | |
| 6,081,793 A | 6/2000 | Challener et al. | |
| 6,163,771 A | 12/2000 | Walker et al. | |
| 6,327,578 B1 | 12/2001 | Linehan | |
| 6,839,692 B2 | 1/2005 | Carrott et al. | |
| 6,931,382 B2 | 8/2005 | Laage et al. | |
| 7,003,493 B2 | 2/2006 | Weichert et al. | |
| 7,055,742 B2 | 6/2006 | Sinha | |
| 7,162,640 B2 | 1/2007 | Heath et al. | |
| 7,197,167 B2 * | 3/2007 | Chung et al. | 382/123 |
| 7,225,156 B2 | 5/2007 | Fisher et al. | |
| 7,346,586 B1 | 3/2008 | Walmsley | |
| 7,431,209 B2 | 10/2008 | Chung | |
| 7,458,512 B2 | 12/2008 | Colson et al. | |
| 7,461,787 B2 | 12/2008 | Chung | |
| 7,490,768 B2 | 2/2009 | Seliger et al. | |
| 7,549,049 B2 | 6/2009 | Bogasky et al. | |
| 7,561,724 B2 | 7/2009 | Chung et al. | |
| 7,571,142 B1 | 8/2009 | Flitcroft et al. | |
| 7,631,193 B1 | 12/2009 | Hoffman | |

(Continued)

FOREIGN PATENT DOCUMENTS

WO    WO2007/064884    6/2007

OTHER PUBLICATIONS

"Visa Best Practices for Tokenization Version 1.0", Jul. 14, 2010, Visa.

(Continued)

*Primary Examiner* — Tsan-Yu J Huang
(74) *Attorney, Agent, or Firm* — K&L Gates LLP

(57) ABSTRACT

Various embodiments are directed to systems and methods for facilitating voting. A first computer system may select a voter data pack for a first voter. The first computer system may also store an indication of the voter data pack and encrypt the voter data pack. A second computer system may receive the encrypted voter data pack and consolidate the encrypted voter data pack with checkable data. The second computer system may also store an association between the encrypted voter data pack and the checkable data, and encrypt the consolidated encrypted voter data pack and checkable data to generate a consolidated voter authorization for the first voter.

21 Claims, 8 Drawing Sheets

(56) References Cited

U.S. PATENT DOCUMENTS

| | | |
|---|---|---|
| 7,635,087 B1 | 12/2009 | Chung et al. |
| 7,637,429 B2 | 12/2009 | Cordery et al. |
| 7,640,181 B2 | 12/2009 | McClure et al. |
| 7,729,991 B2 | 6/2010 | Rodriguez et al. |
| 7,774,594 B2 | 8/2010 | Lopez et al. |
| 7,849,513 B1 | 12/2010 | Weber |
| 7,996,288 B1 | 8/2011 | Stolfo |
| 8,380,177 B2 | 2/2013 | Laracey |
| 8,549,279 B1 | 10/2013 | Sahasranaman et al. |
| 8,578,176 B2 | 11/2013 | Mattsson |
| 8,584,251 B2 | 11/2013 | McGuire et al. |
| 2001/0029485 A1 | 10/2001 | Brody et al. |
| 2001/0032192 A1 | 10/2001 | Putta et al. |
| 2002/0062281 A1 | 5/2002 | Singhal |
| 2002/0112171 A1* | 8/2002 | Ginter et al. ............... 713/185 |
| 2003/0061170 A1 | 3/2003 | Uzo |
| 2003/0069857 A1 | 4/2003 | Junda |
| 2005/0132194 A1 | 6/2005 | Ward |
| 2005/0218224 A1 | 10/2005 | Boldin |
| 2005/0246528 A1 | 11/2005 | Powers |
| 2005/0268334 A1* | 12/2005 | Hesselink et al. ............... 726/11 |
| 2006/0080545 A1 | 4/2006 | Bagley |
| 2006/0229991 A1 | 10/2006 | Campagna |
| 2006/0280191 A1* | 12/2006 | Nishida et al. ............... 370/401 |
| 2007/0050303 A1 | 3/2007 | Schroeder et al. |
| 2007/0051804 A1 | 3/2007 | Anderson |
| 2007/0192245 A1 | 8/2007 | Fisher et al. |
| 2007/0246534 A1 | 10/2007 | Feldkamp et al. |
| 2008/0028206 A1 | 1/2008 | Sicard |
| 2008/0110985 A1 | 5/2008 | Cohen et al. |
| 2008/0179399 A1 | 7/2008 | Phillips |
| 2008/0201643 A1 | 8/2008 | Nagaitis et al. |
| 2008/0222417 A1 | 9/2008 | Downes et al. |
| 2008/0230594 A1 | 9/2008 | Anderson et al. |
| 2008/0294559 A1 | 11/2008 | Wield et al. |
| 2008/0319905 A1 | 12/2008 | Carlson |
| 2009/0006860 A1 | 1/2009 | Ross |
| 2009/0034716 A1 | 2/2009 | Teranishi |
| 2009/0044246 A1 | 2/2009 | Sheehan et al. |
| 2009/0070583 A1 | 3/2009 | Von Mueller et al. |
| 2009/0072032 A1* | 3/2009 | Cardone et al. ............... 235/386 |
| 2009/0106092 A1 | 4/2009 | Bowers |
| 2009/0121019 A1 | 5/2009 | Bauchot et al. |
| 2009/0144135 A1 | 6/2009 | Jorba et al. |
| 2009/0230192 A1 | 9/2009 | Ghafarzadeh |
| 2009/0249082 A1 | 10/2009 | Mattsson |
| 2009/0299841 A1 | 12/2009 | Bishop et al. |
| 2010/0268650 A1* | 10/2010 | Dare et al. ............... 705/71 |
| 2011/0066497 A1 | 3/2011 | Gopinath et al. |
| 2011/0161233 A1 | 6/2011 | Tieken |
| 2012/0041881 A1 | 2/2012 | Basu et al. |
| 2012/0143759 A1 | 6/2012 | Ritorto et al. |
| 2012/0158593 A1 | 6/2012 | Garfinkle et al. |

OTHER PUBLICATIONS

Schneier, Bruce, "Applied Cryptography", 1996, Wiley & Sons, Inc.
Search Report and Written Opinion dated Apr. 23, 2012 issued for International PCT Application No. PCT/US2011/064923 filed Dec. 14, 2011.
U.S. Appl. No. 12/970,414, filed Dec. 16, 2010.

* cited by examiner

SYSTEMS AND METHODS FOR VOTING

BACKGROUND

Voting in large and small scale elections has traditionally been conducted according to a patchwork of manual, mechanical and electronic methods. One manual method commonly in use is the optical scan ballot. According to optical scan ballot methods, each voter marks a paper ballot in a location corresponding to the desired vote, usually with a pen. The paper ballots are then fed into automated scanners equipped with specialized software that allows the votes to be read and tallied electronically. Mechanical methods, although not widely in use at the present time, typically involve direct recording mechanical devices that keep a running tally of votes cast. Electronic methods include direct recording electronic systems. According to these systems, voters enter their vote through an electronic interface (often a touch screen). Through the interface, the voter is presented with an on-screen ballot and votes for candidates electronically. An electronic computer, or other device, keeps a tally of votes cast through the interface. Some direct recording electronic systems have been implemented to generate a physical ballot indicating each selection for recount purposes.

It is desirable for voting methods to maximize ease of use, counting accuracy, re-counting accuracy, system security, and voter privacy. For example, it is desirable for voting systems to be capable of use without unnecessary confusion or burden by voters lacking any sophisticated knowledge. It is also desirable for voting systems to accurately and correctly count all votes that are properly cast. For re-counting accuracy, it is desirable to provide access not only to total votes recorded for each candidate or position, but also to individual ballot records so that each individual ballot may be recounted. For system security, it is desirable that systems prevent the counting of false votes as well as the removal or modification of properly cast votes. For voter privacy, it is desirable to maintain the secrecy of the ballot by minimizing or eliminating any connection between a voter's completed ballot and the voter's identity.

Many existing systems focus narrowly on counting accuracy, recounting accuracy and system security at the expense of the other factors described above. For example, counting accuracy and system security are enhanced by authenticating voters with a unique voter identification prior to voting. Many of these systems encrypt a voter's identification to prevent it from being viewable from the voter's ballot. Even these systems, though, generally fail to create an adequate barrier that separates the voter's voting data from the voter's personal information data. Even when a voter's identification is encrypted, it is possible to trace back from the use of an ID to the personal identity of the voter by breaking the encryption and/or hacking into a single system showing encrypted identifiers and associated voters. This fails to protect voter privacy which is fundamental to the concept of a secret ballot system of voting.

Further, current and proposed recount methods have focused on the markings on each physical ballot. These schemes are designed to provide a basis for keeping or discarding a particular ballot. They do not ensure an accurate count of the markings on the ballot. They also do not help recover the votes entered on ballots that have been physically lost or damaged during or after the election.

Accordingly, there is a need for systems and methods of secure voting that better balance the concerns described above.

FIGURES

Various embodiments of the present invention are described here by way of example in conjunction with the following figures, wherein.

DESCRIPTION

Various embodiments are directed to systems and methods for facilitating the voting process utilizing voter identifications that are sequentially encrypted by separate computer systems. For example, a voter rolls system may assign a unique voter data pack to each voter (e.g., each registered voter). A record may be kept of each unique voter data pack that has been assigned to a voter. Depending on the desired degree of voter anonymity, the voter rolls system may also store an association between each voter and his or her assigned voter data pack. The voter rolls system may additionally encrypt each assigned voter data pack according to any suitable encryption technique (e.g., symmetric or asymmetric). The encrypted voter data pack may be transmitted to a second system, which may augment the voter data pack with additional checkable data. The second system may also store an association between the checkable data and its associated voter data pack. Additionally, the second system may encrypt the voter data pack in conjunction with its checkable data to generate an encrypted consolidated voter authorization for each voter.

Prior to an election, each voter may be provided with a consolidated voter authorization, for example, on a card or other similar paper or electronic medium. Before the voter is permitted to cast a ballot, the voter may be required to produce his or her consolidated voter authorization, which may be verified using the first and second systems. For example, the second system may decrypt the voter's consolidated voter authorization to produce the encrypted voter data pack and the additional checkable data. The second system may then verify the previously stored association between the encrypted voter data pack and the checkable data. In this way, the second system may ensure that the consolidated voter authorization corresponds to a consolidated voter authorization issued by the second system.

After extraction by the second system, the encrypted voter data pack may be provided to the voter rolls system. The voter rolls system may decrypt the voter data pack and verify that it corresponds to a voter data pack assigned to a voter by the voter rolls system. Provided that the voter data pack is verified, either the voter rolls system or the second system may initiate an authorization message indicating that the voter who produced the consolidated encrypted identification is authorized to cast a ballot. Upon authorization, the voter may cast a ballot according to any suitable manual, mechanical or electronic method. After a voter's ballot is cast, an image of the voter's ballot may be captured and associated with the voter's consolidated voter authorization. For example, the consolidated voter authorization may be physically or electronically reproduced in the image. Ballot images generated as described may be utilized for recount purposes, should a recount become necessary.

Figure 1:
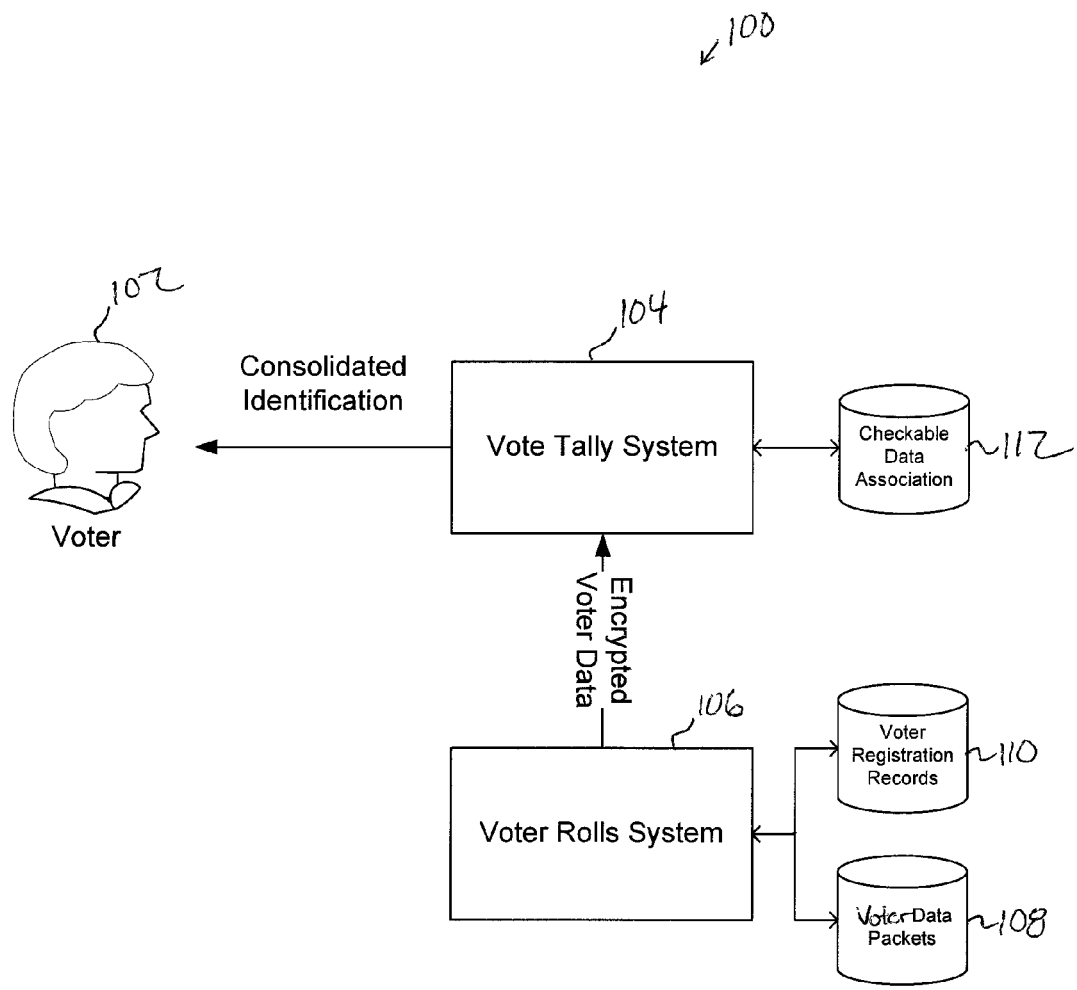
FIG. 1 illustrates a block diagram of a system for generating consolidated voter authorizations for voters.

FIG. 1 illustrates a block diagram of a system 100 for generating consolidated voter authorizations for voters. A voter rolls system 106 may associate voter data packs with each voter and encrypt the voter data packs. The voter rolls system 106 may be in communication with one or more data stores such as, for example, a voter registration records data store 114 and a voter data packs data store 116. The vote tally system 112 may append checkable data to the encrypted voter data packs and perform a second encryption on each combination of an encrypted voter data pack and checkable data. According to various embodiments, the vote tally system 104 and the voter rolls system 106 may be separated from one another, for example, in order to increase the difficulty of hacking into both systems 104, 106. For example, according to various embodiments, the systems 104, 106 may be at different physical locations, on different networks, behind different firewalls, etc.

Figure 2:
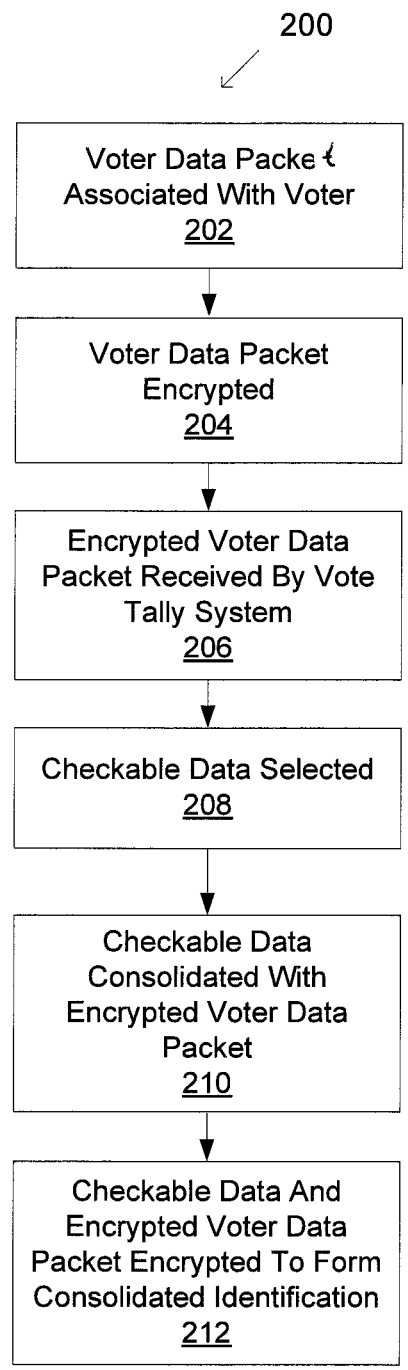
FIG. 2 illustrates one embodiment of a process flow for generating consolidated voter authorizations for a voter utilizing the system of FIG. 1.

FIG. 2 illustrates one embodiment of a process flow 200 for generating consolidated voter authorizations for a voter 102 utilizing the system 100. At 202, the voter rolls system 106 may select a unique voter data pack and associate the voter data pack with a single voter 102. The voter data pack may be selected from a list of available voter data packs in any suitable manner. For example, the voter rolls system 106 may randomly select a voter data pack for the voter 102. According to various embodiments, the voter data pack may be a block of digital data of any suitable size. According to various embodiments, the voter rolls system 106 may select the voter from a list of registered voters. For example, the voter rolls system 106 may be in communication with one or more voter registration records data stores 110 containing lists of registered voters in a precinct, municipality, or other political subdivision. The voter rolls system 106 may select the voter data pack from a master list of unique voter data packs, for example, stored at the voter data packs data store 108.

The degree of association established between the voter 102 and the voter data pack may be determined based on the desired degree of voter anonymity. For example, in embodiments where a high degree of voter anonymity is desired, associating the voter 102 and voter data pack may merely comprise storing an indication that the voter 102 has been assigned a voter data pack, and storing an indication that the voter data pack has been assigned to a voter. In embodiments where a lesser degree of voter anonymity is acceptable, the specific voter data pack, or an indication thereof, may be stored in association with an indication of the voter 102.

At 204, the voter rolls system 106 may encrypt the voter data pack. It will be appreciated that the voter data pack may be encrypted according to any suitable encryption hardware or software method. For example, the voter rolls system 106 may encrypt the voter data pack according to a symmetric, single key encryption method such as, for example, forms of the Advanced Encryption Standard (AES), Data Encryption Standard (DES), RC2, RC4, etc. Any suitable block size may be used. Also, according to various embodiments, an asymmetric or public-key infrastructure (PKI) encryption method may be used. For example, the voter rolls system 106 may have a public key used to encrypt the voter data pack and a private key that may be used to decrypt the data packet. The public key may be generally available, while the private key may not be shared with any other systems. In some embodiments, symmetric and asymmetric encryption methods may be used together. For example, an asymmetric method may be used to transmit a symmetric key that may then be used for further communications.

The encrypted voter data pack may be provided, directly or indirectly, to the vote tally system 104, which may receive the same at 206. The vote tally system 104 may select checkable data at 208 and consolidate the encrypted voter data pack and checkable data at 210. The checkable data may be any sort of data that may be used by the vote tally system 104 to later test for validity. For example, the checkable data may be a date and time that the voter data pack was received, associated with the checkable data, or encrypted (e.g., at 212 described below). The vote tally system 104 may store an association between the encrypted voter data pack and the checkable data, which may be stored at checkable data store 112. In this way, the vote tally system 104 may later validate the consolidated encrypted voter data pack and checkable data by verifying that the appropriate association exists. In embodiments where additional security is desired, the checkable data may be associated with the voter 102. For example, the checkable data may comprise an identifier of the voter 102 including, for example, an address, Social Security or other identifying number, fingerprint or other biometric, etc. It will be appreciated, however, that associating the checkable data to the voter 102 may reduce the strength of voter anonymity.

At 212, the vote tally system 104 may encrypt the consolidated voter data pack and checkable data to generate the consolidated voter authorization for the voter 102. The encryption may be performed according to any suitable symmetric or asymmetric method, including combinations thereof. According to various embodiments, the process flow 200 may be performed for each voter indicated at the voter registration records 110. In this way, a unique consolidated voter authorization may be generated for each voter. According to various embodiments, each consolidated voter authorization may be used for a single election (e.g., a unique voter authorization may be used to vote only once).

When generated, consolidated voter authorizations may be communicated to voters in any suitable paper or electronic form. According to various embodiments, each voter may be provided with a card listing the voter's consolidated voter authorization. For example, the consolidated voter authorization may be represented on the card in alphanumeric form and/or as a bar code or other machine-readable format. Also, according to various embodiments, voters may be provided with consolidated voter authorizations on magnetic scan cards, smart cards (e.g., cards with onboard computer memory) or other computer-readable media. In some embodiments, a voter's consolidated voter authorization may be provided electronically (e.g., via e-mail). The voter may then record the consolidated identifier, on paper or electronically.

Figure 3:
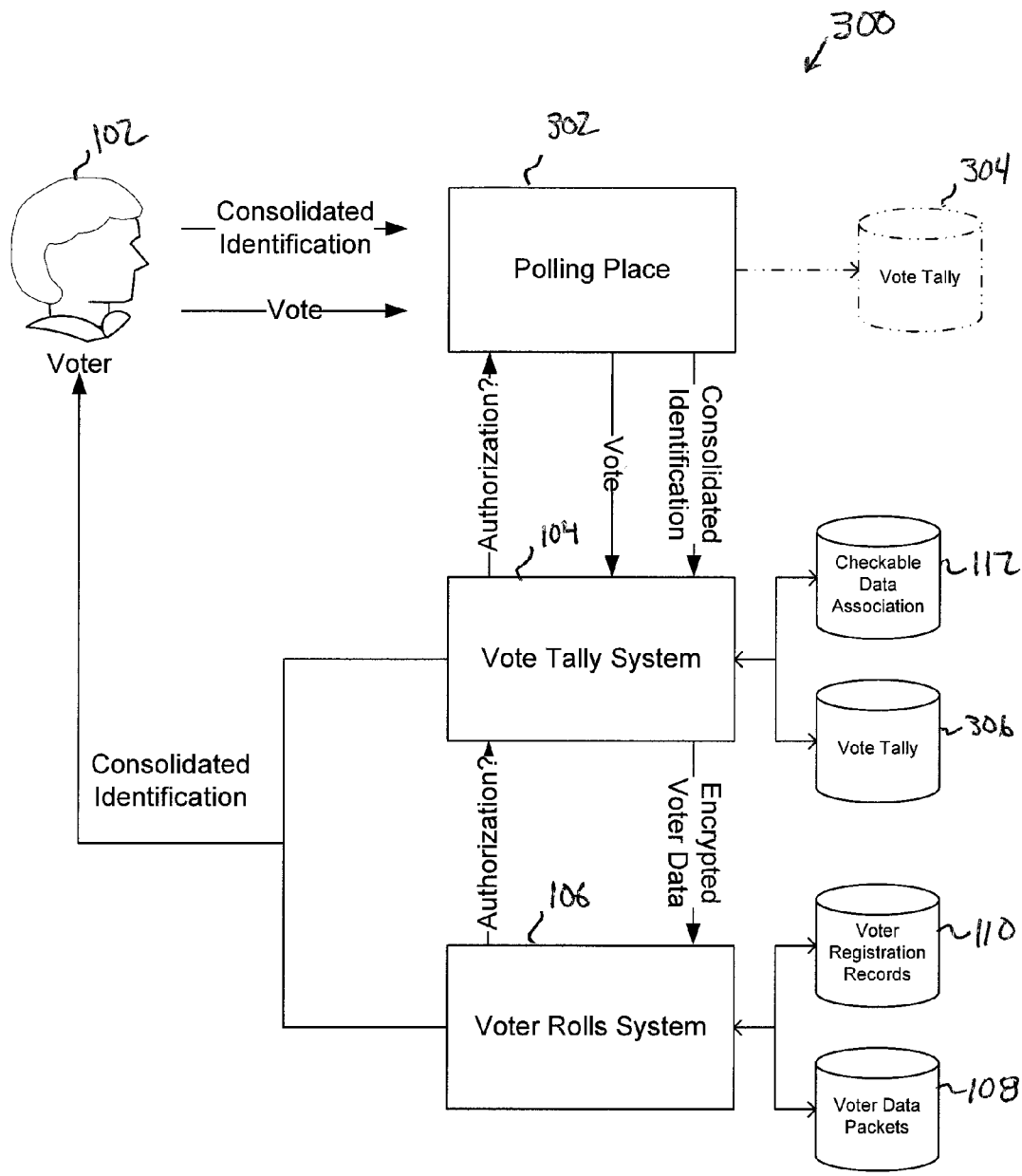
FIG. 3 illustrates one embodiment of a system for receiving a vote at a polling place using a consolidated voter authorization generated as described herein.

According to various embodiments, the consolidated voter authorization may be utilized by any suitable manual, mechanical or electronic voting process. For example, FIG. 3 illustrates one embodiment of a system 300 for receiving a vote using a consolidated voter authorization generated as described herein. The system 300 may generally describe embodiments where the voter 102 physically travels to a polling place 302 to cast a vote. The polling place 302 may utilize any sort of manual, mechanical, or computerized voting methods, as will be described herein. For example, the polling place 302 may comprise any suitable equipment for receiving, recording and/or counting votes as well as for communicating with one or more of the vote tally system 104 and the voter rolls system 106.

Figure 4:
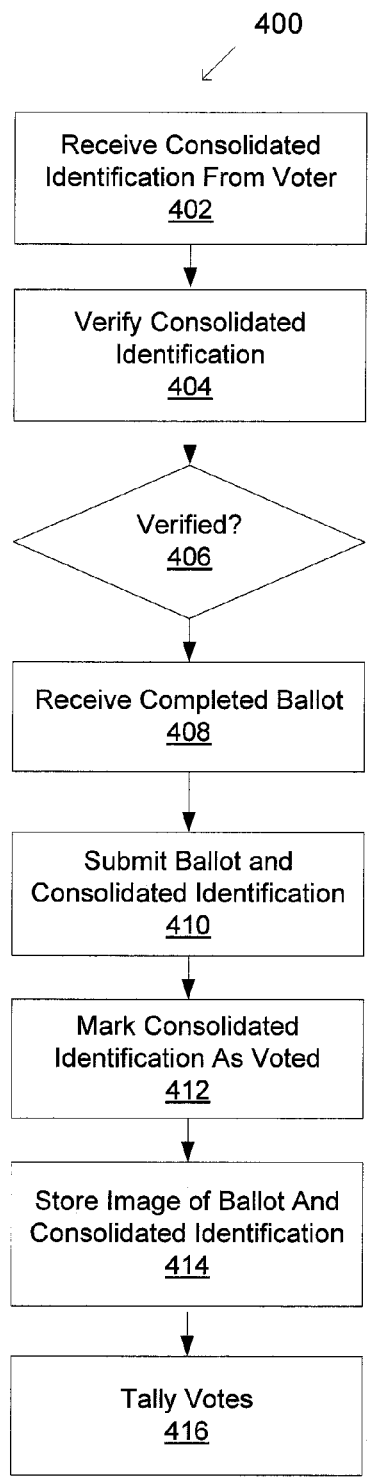
FIG. 4 illustrates one embodiment of a process flow for processing a vote with the system of FIG. 3.

FIG. 4 illustrates one embodiment of a process flow 400 for processing a vote with the system 300. At 402, the polling place 302 may receive a consolidated voter authorization from the voter 102. This may be accomplished in any suitable way. For example, the voter 102 may provide an alphanumeric representation of the consolidated voter authorization at a keyboard or other suitable input device at the polling place 302. Also, for example, the voter 102 may produce a card or other medium comprising a computer readable representation of the consolidated voter authorization. The polling place 302 may comprise a suitable scanner or other device for reading the computer readable representation. At 404, the consolidated voter authorization of the voter 102 may be verified. Verifying the consolidated voter authorization may comprise determining whether the consolidated voter authorization has been properly assigned to a voter and has not been previously voted. Additional details of the verification process are described hereinbelow. If the consolidated voter authorization is not verified, the voter 102 may not be permitted to cast a regular ballot.

Provided that the consolidated voter authorization is verified (406), the polling place 302 may provide the voter 102 with a ballot and receive a completed ballot at 408. The ballot may be any suitable type of ballot. For example, if the polling place is utilizing a direct recording electronic device, the ballot may be provided to the voter 102 via a computer device (such as a touch screen). If the polling place is utilizing a manual method, such as an optical scan method, the ballot may be a paper ballot configured to be tallied by an optical scanning or other similar device. After the ballot is received from the voter 102, the polling place 302 may submit the completed ballot and the consolidated voter authorization to the vote tally system 104 and/or the voter rolls system 106 at 410. The consolidated voter authorization may be marked as voted at 412 (e.g., at one or both of the vote tally system 104 and the voter rolls system 106).

According to various embodiments, the polling place 302 may also capture an image of the completed ballot and the consolidated voter authorization. For example, when the polling place 302 is using a paper-type ballot, a representation of the consolidated voter authorization may be physically affixed to the ballot and an image captured. Also, for example, the representation of the consolidated voter authorization may be electronically affixed to the image utilizing any suitable technology. In some cases (e.g., upon failure of a paper ballot scanning machine), the consolidated voter authorization may be hand-written to a ballot prior to image capture. The image may be captured and/or stored according to any suitable electronic image format including, for example, .jpg, .bmp, .gif, .tif, etc. According to various embodiments, the image may be grayscale or color and may be of a suitable resolution to distinguish between markings used to indicate votes on the ballot.

The ballot may be tallied at 416. It will be appreciated that the ballot may be tallied by any suitable component of the system 300. For example, the polling place or precinct 302 may tally the ballot (e.g., utilizing a Direct Recording Electronic device, optical scanner or other suitable mechanism). Results of the tallying may be stored at a vote tally data store 304 and provided to a central location when the polls close. In addition to, or instead of, tallying by the polling place 302, the ballot may be tallied by the vote tally system 104, for example, as described herein with respect to FIG. 6.

Figure 5:
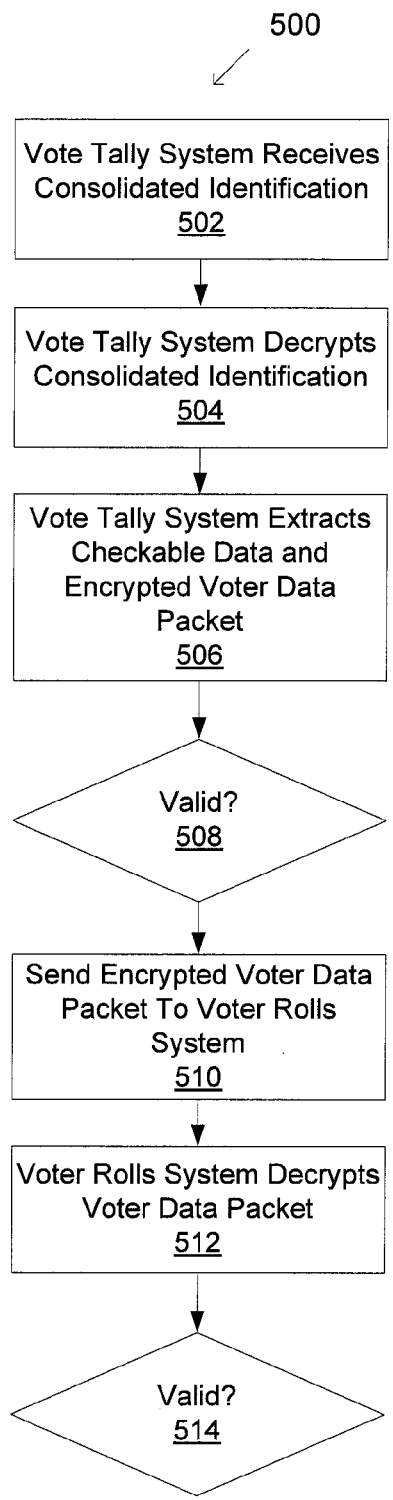
FIG. 5 illustrates one embodiment of a process flow for verifying a consolidated voter authorization received from a voter to determine if the voter is authorized to cast a ballot.

FIG. 5 illustrates one embodiment of a process flow 500 for verifying a consolidated voter authorization received from a voter 102 to determine if the voter 102 is authorized to cast a ballot. At 502, the vote tally system 104 may receive a consolidated voter authorization of the voter 102. For example, the consolidated voter authorization may be received through the polling place 302 or via a proxy server 702 described below. The consolidated voter authorization may be accompanied by a request for verification. The vote tally system 104 may decrypt (504) the consolidated voter authorization and extract (506) from the result an encrypted voter data pack and unencrypted checkable data. At 508, the vote tally system 104 may determine whether the checkable data is validly associated with the encrypted voter data pack. For example, the vote tally system 104 may determine whether the checkable data has previously been associated with the encrypted voter data pack at the checkable data association data store 112. In some embodiments, the vote tally system 104 may also determine whether the checkable data and encrypted voter data pack have been previously used to authorize a vote (e.g., previously voted). If so, they may be found invalid. In embodiments where the checkable data is associated with the voter, the vote tally system 104 may additionally check to ensure that the voter 102 requesting authorization to cast a ballot is the same voter indicated by the checkable data.

If the association between the voter data pack and the checkable data is valid, the encrypted voter data pack may be provided to the voter rolls system 106 at 510. The voter rolls system 106 may decrypt the voter data pack at 512 and determine if the voter data pack is valid. Determining if the voter data pack is valid may comprise verifying that (a) the voter data pack was previously assigned to a voter, and (b) the voter data pack has not been previously used to authorize a vote. Provided that these conditions are true, the voter 102 may be authorized to cast a ballot and a message to that effect may be provided to the polling place 302 or proxy server 702 via any suitable communication format or route. It will be appreciated that additional validation conditions may also be applied. For example, in embodiments, when the voter data pack is directly associated with a voter, the voter rolls system 106 may perform a further check to ensure that the voter 102 requesting authorization to cast a ballot is the same voter that was originally associated with the voter data pack.

Figure 6:
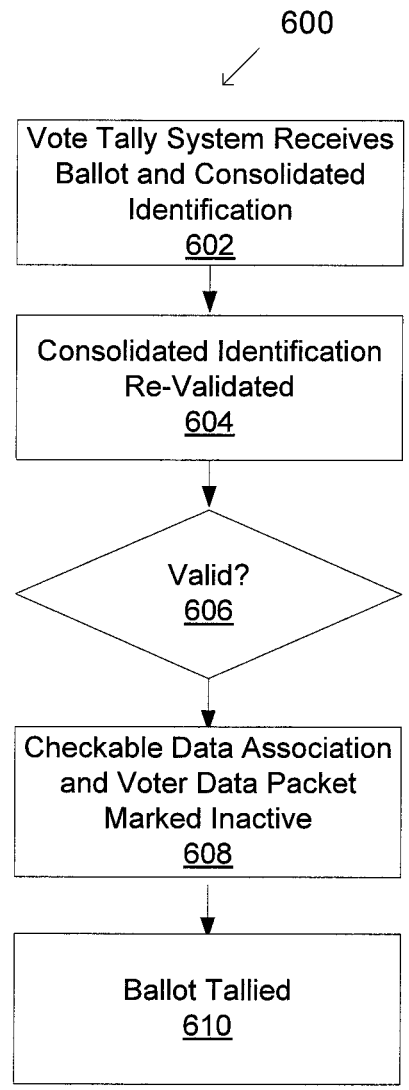
FIG. 6 illustrates one embodiment of a process flow for processing a cast ballot.

FIG. 6 illustrates one embodiment of a process flow 600 for processing a cast ballot. At 602, the vote tally system 104 may receive a cast ballot and the consolidated voter authorization of the voter 102 who cast the ballot. Optionally, the consolidated voter authorization of the voter 102 may be re-validated at 604. If the consolidated voter authorization is found valid (606), the component checkable data association and voter data pack may be marked as inactive, or already voted. In this way, if the voter 102, or another individual, attempts to use the consolidated voter authorization for a second time, the consolidated voter authorization will not be verified, preventing a second vote. Marking the checkable data association and voter data pack as inactive may be performed by the vote tally system 104 and/or the voter rolls system 106. For example, the vote tally system 104 may decrypt the consolidated voter authorization, extract the checkable data, and mark the association between the checkable data and the voter data pack as inactive. The encrypted voter data pack may be provided to the voter rolls system 106, which may decrypt the voter data pack and mark it as inactive. At 610, the ballot may be tallied, for example, by the vote tally system 104. For example, vote tallies may be stored at a vote tally data store 306.

Figure 7:
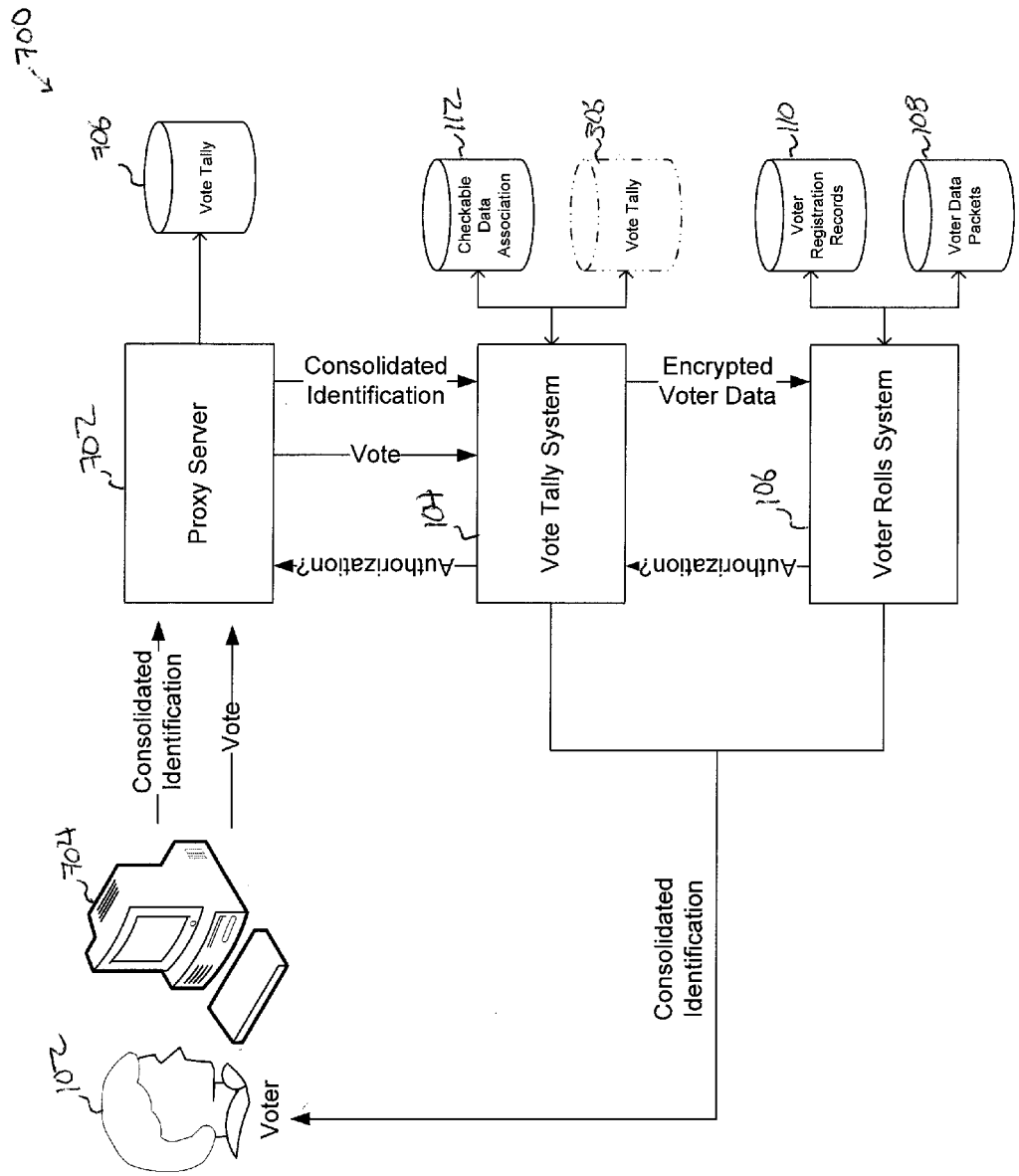
FIG. 7 illustrates one embodiment of a system for receiving a vote over a network using a consolidated voter authorization generated as described herein.

According to various embodiments, the systems and methods described herein may be adapted to support secure, secret-ballot voting over the Internet or other suitable network. FIG. 7 illustrates one embodiment of a system 700 for receiving a vote over a network using a consolidated voter authorization generated as described herein. The voter 102 may access the Internet, or other network, via a network device 704. The network device 704 may be any suitable device capable of communication on a network including, for example, a personal computer, a laptop computer, a personal digital assistant, a mobile telephone, etc. The network device 704 may communicate with a proxy server 702, which may be in communication with the vote tally system 104 and/or the voter rolls system 106. As described herein, the proxy server may be configured to strip indications of the voter 102 and/or the network device 704 before providing communications to the vote tally system 104 and/or the voter rolls system 106. This may allow the voter 102 to remain anonymous to the vote tally system 104 and/or the voter rolls system 106.

Figure 8:
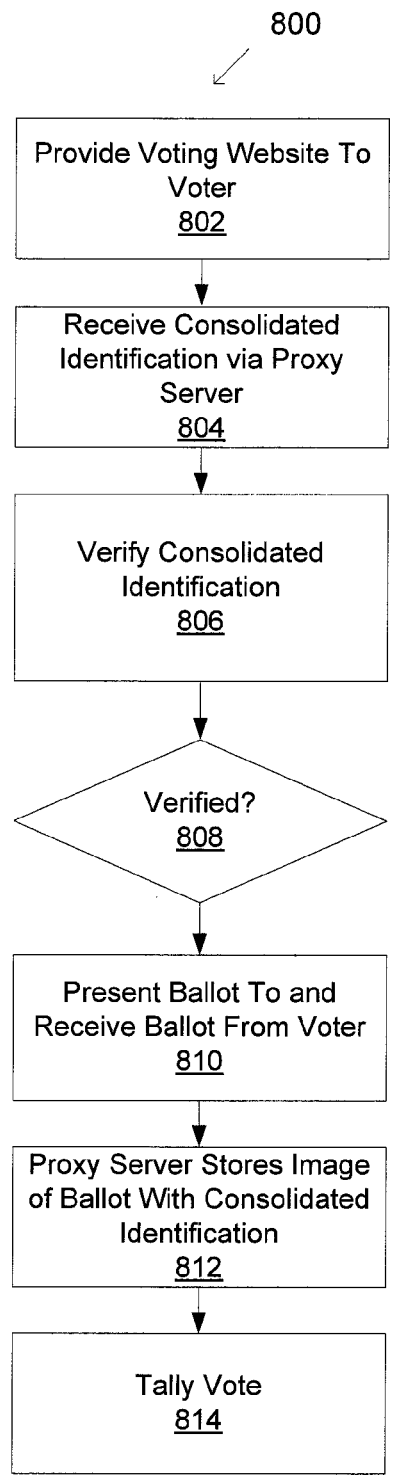
FIG. 8 illustrates one embodiment of a process flow for processing a vote with the system of FIG. 7.

FIG. 8 illustrates one embodiment of a process flow for processing a vote with the system 700. At 802, a voting interface (e.g., a website) may be provided to the voter 102 via the network device 704. The interface may prompt the voter 102 to provide a consolidated voter authorization. The voter 102 may enter his or her consolidated voter authorization via the network device 704 in any suitable way. For example, when the consolidated voter authorization is provided to the voter 102 in alphanumeric form, the voter 102 may enter the alphanumeric consolidated voter authorization via a keyboard. Also, for example, when the consolidated voter authorization is provided to the voter 102 in a computer readable form (e.g., a smart card, a pen drive, etc.), the voter 102 may utilize the network device 704 to read the consolidated voter authorization.

The network device 704 (e.g., via the interface), may provide the consolidated voter authorization to the proxy server 702, which may receive the same at 804. At 806, the consolidated voter authorization may be verified. For example, the consolidated voter authorization may be verified in a manner similar to that described above with respect to the process flow 500. It will be appreciated that, in embodiments where voter anonymity is prioritized, the proxy server 702 may strip communications to the vote tally system 104 of any indication of the voter or the network device 704 (e.g., Internet Protocol (IP) address, Media Access Control (MAC) address, etc.).

Provided that the consolidated voter authorization is verified at 808, the ballot may be presented to the voter 102 at 810, for example, via the network device 704. The voter may complete the ballot in any suitable manner and return it to the proxy server 702 via the network device. According to various embodiments, the proxy server may generate and/or store an image of the completed ballot in association with the consolidated voter authorization of the voter 102 (e.g., in one or more of the formats described above). For example, the proxy server 702 may electronically affix an indication of the consolidated voter authorization to an image of the completed ballot and store the same for future access (e.g., in the case of a recount). According to various embodiments, the proxy server 702 may capture the image by performing a screen capture from the network device 704. At 814, the votes indicated by the received ballot may be tallied. In some embodiments, the proxy server 702 itself may maintain a tally of votes cast through the proxy server 702 (e.g., at a vote tally data store 706). At the conclusion of a voting period, results from the vote tally data store 706 may be provided to a central location (e.g., the vote tally system 104) to determine the outcome of the election. According to other various embodiments, votes may be tallied directly at the vote tally system 104 (e.g., at vote tally data store 306).

According to various embodiments, the systems and methods described herein may facilitate recounts. For example, if a recount is desired, the images of each cast ballot (e.g., as captured at 414 and 812) may be recalled. For example, the images may be stored on any sort of non-volatile data storage. According to various embodiments, the non-volatile data storage may reside off-line to prevent hacking, be durable and have a large capacity (e.g., large enough to store all of the ballots expected to be cast at a voting location 302 or proxy server 702). Examples of non-volatile data storage include, for example, writable compact disks (CD's) or digital video disks (DVD's). When the images are recalled, each ballot may be reviewed manually or automatically. Also, because each ballot may indicate a consolidated voter authorization of the voter who cast the ballot, it may be possible to also re-validate each voter during the recount.

According to various embodiments, multi-sweep recounts may be performed. For example, at a first sweep, image files may be automatically re-counted. For example, when the image files show optical scan paper ballots, the images themselves may be provided to optical scan vote counters for re-count. In other embodiments utilizing optical scan or electronic ballots, the images may be analyzed by any suitable image processing algorithms for determining the location of markings on each ballot indicating the vote or votes thereon. At a second sweep of the re-count, each image may be individually and manually analyzed. According to various embodiments, the two sweeps may be combined, for example, by using the first sweep for uncontested ballots and the second sweep for those ballots that are contested and, therefore, require additional scrutiny.

According to various embodiments, the systems and methods described herein may be robust enough to handle contingencies that may occur during the voting process. For example, it will be appreciated that communications may be lost between the polling place 302/proxy server 702 and the vote tally system 104 and/or voter rolls system 106. In this case, the voter 102 may be provided with, and may fill out a ballot. Ballots filled out during a communications failure may be kept at the polling place 302 or proxy server 702 until communication is restored, at such time the stored votes may be verified and, if proper, cast as described herein. The systems 100, 300, 700 may respond similarly upon a failure of communications between the vote tally system 104 and the voter rolls system 106. The vote tally system 104 may continue to operate provisionally, accepting and separately tallying ballots. When communication is restored, the vote tally system 104 may verify held ballots and, if proper, cast them as described herein.

It will also be appreciated that hackers may attempt to access various components of the systems 100, 300, 700 in order to improperly tamper with votes and/or voter authorization. The systems 100, 300, 700 may be robust so as to avoid or mitigate such attacks. For example if a voting machine at the polling place 302 is hacked, the ballot images may be utilized to accurately re-generate any lost votes. If a proxy-server 702 is hacked, ballot images may be used in the same way to recreate any lost ballots. Additionally, if hacking causes a proxy server 702 to shut down, requests to vote may be shunted to other proxy servers (not shown) in communication with the vote tally system 104 and/or the voter rolls system 106.

Steps may be taken to prevent hacking of the voter rolls system 106 or the vote tally system 104. For example, these systems 104, 106 may not be connected to any network or other outside communication source until voting begins. Additionally, they may be examined each day to determine that they are in operation and to check for compromise due to hacking. Additionally, the systems 104, 106 may be set up to accept commands only from voters with valid consolidated voter authorizations.

An additional security feature of the systems 100, 300, 700 may arise from the dual nature of the voter rolls system 106 and the vote tally system 104. For example, in order to nefariously generate a consolidated voter authorization, a hacker would be required to separately hack into both systems 104, 106, which may pose a considerable challenge. Also, because vote totals may be kept at multiple locations (e.g., the polling place 302 or proxy server 702 and the vote tally system 104), it may be necessary to hack into two separate systems in order to change vote totals. Additionally, any changed vote totals may be detected in a recount based on ballot images. Should it be determined that the decryption key of either of the systems 104, 106 has been stolen or compromised, the systems 104, 106 may generate new decryption keys and replace any consolidated voter authorizations created during the time that the decryption key or keys was compromised.

The various systems 100, 300, 700 described herein may represent a complete voting system or, in some embodiments, may represent one component of a larger system. For example, the system or systems 100, 300, 700 may be implemented by a single precinct, county, congressional district, etc., with other subdivisions implementing similar or different voting systems. Also, it will be appreciated that the networked nature of the systems 300, 700 may facilitate the addition of new polling places designed to handle smaller number of voters. For example, referring to the system 700, a network device 704 may be set up by a voting authority and may act as a polling place. Voters may cast their ballots at the network device 704 in the manner described by the process flow 800. The cost of such network device polling places may be minimal, making it cost effective to have more of them.

Different computer systems 104, 106, 702, 704, the systems of 302, etc., are described herein as communicating with one another. It will be appreciated that this communication may take place in any suitable method. For example, according to various embodiments, some or all of the computer systems described herein may be in communication with one another via a network or networks. The network or networks may operate according to any suitable wired or wireless communication protocol and may utilize any suitable hardware or software. In some embodiments, the network or networks may include, a wide area network (WAN) such as the Internet, a local area network (LAN), etc.

When communications between the systems 104, 106, 702, 704, the systems of 302, etc., take place over the Internet or other public network, it will be appreciated that these communications may be encrypted. For example, one or more of the systems may utilize an asymmetric or public key infrastructure (PKI) method. According to a PKI system, each system may have a public key that may be used for encrypting messages and a private key that may be used for decryption. The public key may be provided to any systems having need to send data to the first system. The data may be encrypted with the public key such that it may only be decrypted with the private key, which may be kept secret by the receiving system. In this way, all communications between the various systems may be decrypted only by their intended recipients.

According to various embodiments, the systems 104, 106, 702, 704 may each be implemented on exclusive hardware. For example, the system 104 may not share any hardware with the system 106. Also, for example, the system 702 may not share any hardware with the system 704. This may increase security as it may make it more difficult for a potential hacker to access the sensitive operations of both system 104, 106 and/or system 702, 704, as would be necessary to tamper with the election process. In other embodiments, though, the systems may share common hardware. For example, the systems 104, 106 may be implemented on a single computer device or a common set of computer devices. Hardware or software tools may be utilized to provide segregation between the systems 104, 106 in order to increase the difficulty of hacking both systems 104, 106 to tamper with an election. For example, a firewall may be implemented to limit the types and security of electronic communications between the system 104, 106. It will be appreciated that the systems 702, 704 may also be implemented with overlapping hardware, for example, as described herein.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. For example, no particular aspect or aspects of the examples of system architectures, methods or processing structures described herein are necessarily intended to limit the scope of the invention.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these sorts of focused descriptions would not facilitate a better understanding of the present invention, and therefore, a more detailed description of such elements is not provided herein.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention.

Moreover, the processes associated with the present embodiments may be executed by programmable equipment, such as computers. Software or other sets of instructions that may be employed to cause programmable equipment to execute the processes. The processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer device," "host," "engine," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers or computer systems described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. The network may use routers and/or public communication links. One type of data communication network may cover a relatively broad geographic area (e.g., city-to-city or country-to-country) which uses transmission facilities provided by common carriers, such as telephone service providers. In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java). Also, application servers may be provided in accordance with the .NET framework, including the Windows Communication Foundation, .NET Remoting, ADO.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

While various embodiments of the invention have been described herein, it should be apparent, however, that various modifications, alterations and adaptations to those embodiments may occur to persons skilled in the art with the attainment of some or all of the advantages of the present invention. The disclosed embodiments are therefore intended to include all such modifications, alterations and adaptations without departing from the scope and spirit of the present invention as set forth in the appended claims.

We claim:

1. A method for facilitating voting, the method comprising:
    for a first voter, selecting a voter data pack by a first computer system;
    storing, by the first computer system, an indication of the voter data pack;
    encrypting, by the first computer system, the voter data pack to generate an encrypted voter data pack;
    receiving, by a second computer system, the encrypted voter data pack;
    consolidating, by the second computer system, the encrypted voter data pack with checkable data to generate a consolidated encrypted voter data pack;
    storing, by the second computer system, an association between the encrypted voter data pack and the checkable data;
    encrypting, by the second computer system, the consolidated encrypted voter data pack to generate a consolidated voter authorization for the first voter;
    communicating the consolidated voter authorization to the first voter;
    receiving, by at least one of the first computer system and the second computer system, the consolidated voter authorization from the first voter; and
    decrypting, by the second computer system, the consolidated voter authorization to produce the consolidated encrypted voter data pack;
    separating the consolidated encrypted voter data pack into the encrypted voter data pack and the checkable data;
    verifying, by the second computer system, the association between the encrypted voter data pack and the checkable data;
    receiving, by the first computer system, the encrypted voter data pack;
    decrypting, by the first computer system, the encrypted voter data pack to generate the voter data pack;
    determining, by the first computer system, that the voter data pack has been previously assigned;
    determining, by the first computer system, that the voter data pack is not marked inactive; and
    conditioned upon the voter data pack being previously assigned, the voter data pack not being marked inactive, and the association between the encrypted voter data pack and the checkable data being verified, send voter authorization data indicating that the first voter is authorized to cast a ballot.

2. The method of claim 1, wherein communicating the consolidated voter authorization to the first voter comprises generating a card comprising a computer-readable code indicating the consolidated voter authorization.

3. The method of claim 2, wherein the computer-readable code is stored utilizing at least one of: a printed bar code, a magnetic strip, and a memory chip.

4. The method of claim 1, wherein the first computer system and the second computer systems are at different physical locations.

5. The method of claim 1, wherein the first computer system and the second computer system are behind different firewalls.

6. The method of claim 1, wherein storing the indication of the voter data pack comprises storing an indication of the voter data pack in conjunction with an indication of the first voter.

7. The method of claim 1, wherein storing the indication of the voter data pack comprises storing an indication that the voter data pack has been assigned without an indication of the first voter.

8. The method of claim 1, wherein encrypting the voter data pack comprises utilizing an encryption method selected from the group consisting of a symmetric encryption method and an asymmetric encryption method.

9. The method of claim 1, wherein the checkable data comprises an indication of the first voter.

10. The method of claim 1, wherein the checkable data comprises an indication of a timestamp.

11. The method of claim 1, further comprising:
    receiving, by the first computer system, an indication that the first voter has cast a ballot; and
    marking, by the first computer system, the voter data pack inactive.

12. The method of claim 1, further comprising:
    receiving, by the second computer system, an indication that the first voter has cast a ballot; and
    marking, by the second computer system, the association between the encrypted voter data pack and the checkable data inactive.

13. The method of claim 1, wherein verifying the association between the encrypted voter data pack and the checkable data comprises determining whether a record of the association is stored at a data store in communication with the second computer system.

14. The method of claim 1, further comprising:
    receiving a ballot that was cast by the first voter; and generating an image of the ballot in association with the consolidated voter authorization.

15. The method of claim 14, wherein the ballot is selected from the group consisting of an optical scan ballot and an electronic ballot.

16. The method of claim 14, wherein the image is a digital image.

17. The method of claim 14, further comprising storing the image of the ballot and images of additional ballots cast by additional voters at a non-volatile data storage.

18. The method of claim 14, wherein receiving the consolidated voter authorization from a first voter comprises receiving the consolidated voter authorization via a proxy server and wherein receiving the consolidated voter authorization does not include receiving information indicating its source.

19. A system for facilitating voting, comprising:
a first computer system, wherein the first computer system is programmed to:
for a first voter, select a voter data pack;
store an indication of the voter data pack;
encrypt the voter data pack to generate an encrypted voter pack; and
after verifying the association between the encrypted voter data pack and checkable data by a second computer system:
receive the encrypted voter data pack;
decrypt the encrypted voter data pack to generate the voter data pack; and
determine that the voter data pack has been previously assigned and is not marked inactive;
a second computer system, wherein the second computer system is programmed to:
receive the encrypted voter data pack;
consolidate the encrypted voter data pack with the checkable data to generate a consolidated encrypted voter pack;
store an association between the encrypted voter data pack and the checkable data; and
encrypt the consolidated encrypted voter data pack to generate a consolidated voter authorization for the first voter, wherein the consolidated voter authorization is to be communicated to the first voter; and
after receiving the consolidated voter authorization from the first voter:
decrypt the consolidated voter authorization to produce the consolidated encrypted voter data pack;
separate the consolidated encrypted voter data pack into the encrypted voter data pack and the checkable data;
verify the association between the encrypted voter data pack and the checkable data; and
conditioned upon the voter data pack being previously assigned, the voter data pack not being marked inactive, and the association between the encrypted voter data pack and the checkable data being verified, transmit voter authorization data indicating that the first voter is authorized to cast a ballot.

20. The system of claim 19, wherein the first computer system and the second computer system are at different physical locations.

21. A non-transitory computer-readable medium comprising instructions thereon that when executed by at least one processor, cause the at least one processor to:
for a first voter, select a voter data pack by a first computer system;
store, by the first computer system, an indication of the voter data pack;
encrypt, by the first computer system, the voter data pack to generate an encrypted voter data pack;
receive, by a second computer system, the encrypted voter data pack;
consolidate, by the second computer system, the encrypted voter data pack with checkable data to generate a consolidated encrypted voter data pack;
store, by the second computer system, an association between the encrypted voter data pack and the checkable data;
encrypt, by the second computer system, the consolidated encrypted voter data pack to generate a consolidated voter authorization for the first voter, wherein the consolidated voter authorization is to be communicated to the first voter; and
receive, by at least one of the first computer system and the second computer system, the consolidated voter authorization from the first voter;
decrypt, by the second computer system, the consolidated voter authorization to produce the consolidated encrypted voter data pack;
separate the consolidated encrypted voter pack into the encrypted voter data pack and the checkable data;
verify, by the second computer system, the association between the encrypted voter data pack and the checkable data;
receive, by the first computer system, the encrypted voter data pack;
decrypt, by the first computer system, the encrypted voter data pack to generate the voter data pack;
determine, by the first computer system, that the voter data pack has been previously assigned;
determine, by the first computer system, that the voter data pack is not marked inactive; and
conditioned upon the voter data pack being previously assigned, the voter data pack not being marked inactive, and the association between the encrypted voter data pack and the checkable data being verified, transmit the voter authorization indicating that the first voter is authorized to cast a ballot.

* * * * *